United States Patent [19]

Swenson et al.

[11] 4,029,283
[45] June 14, 1977

[54] SEAT SUPPORTING ASSEMBLY

[75] Inventors: Richard F. Swenson, Milwaukee; Shawn H. Eimen, Menomonee Falls; John J. Gryga, Jr., Milwaukee, all of Wis.

[73] Assignee: Milsco Manufacturing Company, Milwaukee, Wis.

[22] Filed: Feb. 2, 1976

[21] Appl. No.: 654,570

[52] U.S. Cl. ............................. 248/399; 248/421
[51] Int. Cl.² ...................................... F16M 13/00
[58] Field of Search .................... 182/69, 157, 158; 187/8.72, 8.71, 18; 248/399, 400, 157, 421, 423, 277; 297/345, 347; 74/521

[56] References Cited

UNITED STATES PATENTS

| 554,516 | 2/1896 | Huhle ............................ 248/421 |
| 1,565,054 | 12/1925 | Brunker et al. ............... 248/399 X |
| 1,647,247 | 11/1927 | Pallenberg ...................... 248/399 |
| 2,821,239 | 1/1958 | Brendel .......................... 248/400 X |
| 3,144,270 | 8/1964 | Bilancia ......................... 248/399 X |
| 3,335,996 | 8/1967 | Hall et al. ....................... 248/400 |
| 3,558,094 | 1/1971 | Radke et al. ................... 248/400 X |
| 3,572,624 | 3/1971 | Holdampf et al. ............. 248/399 X |
| 3,608,855 | 9/1971 | Osenberg ........................ 248/400 |
| 3,888,451 | 6/1975 | Lacey ............................. 248/399 |

FOREIGN PATENTS OR APPLICATIONS

| 139,908 | 1/1951 | Australia ......................... 248/400 |
| 744,577 | 2/1956 | United Kingdom ............ 248/421 |
| 774,129 | 5/1957 | United Kingdom ............ 248/399 |

*Primary Examiner*—Lawrence J. Staab
*Attorney, Agent, or Firm*—James E. Nilles

[57] ABSTRACT

A seat supporting assembly for use in vehicles and the like for resiliently supporting a seat. The seat supporting assembly includes a base which is to be secured to the vehicle and a seat support positioned vertically above the base and resiliently supported by a coil spring. The seat supporting assembly also includes a ride height adjustment assembly and an adjustable vertical movement stop assembly for limiting the upward vertical movement of the seat support. The ride height adjustment assembly includes a plurality of pivotable links extending between the coil spring and the seat support. The links are connected by means of a threaded shaft and are relatively movable at their upper ends to cause vertical extension of the height adjustment assembly thereby causing variation in the height of the seat support. The threaded shaft projects forwardly from under the seat support and is readily accessible to the vehicle operator. The vertical movement stop assembly includes adjustable means for limiting the upward movement of the seat support with respect to the base. The stop assembly is adjustable to permit various ranges of vertical movement of the seat support to be consistent with the position of the seat support as set by the ride height adjustment assembly. The seat supporting assembly also includes means for indicating the relative positions of the ride height adjustment means and the vertical movement stop assembly so that their relative positions can be properly aligned.

9 Claims, 9 Drawing Figures

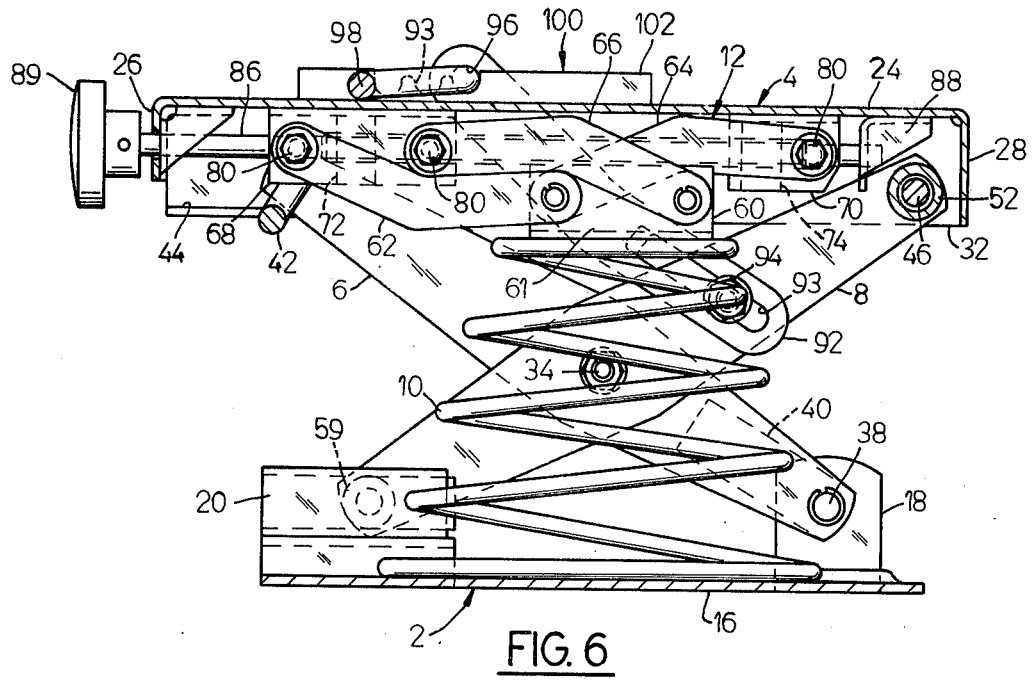

SEAT SUPPORTING ASSEMBLY

BACKGROUND OF THE INVENTION

The present invention relates to seat supporting means for use in vehicles and which provide resilient support for a seat and permit vertical movement of the seat. Such seat supporting assemblies are particularly useful in vehicles such as farm or construction equipment, but are not restricted to such use. Seat supporting assemblies of the type referred to are shown, by way of example, by U.S. Pat. No. 3,917,211, issued to Daunderer et al. on Nov. 4, 1975 and U.S. Pat. No. 3,109,621, issued to Simons et al. on Nov. 5, 1963.

SUMMARY OF THE INVENTION

The present invention comprises an improved seat supporting assembly for resiliently supporting a vehicle seat or the like. The seat supporting assembly includes a base which is to be secured to the vehicle, and a seat support positioned vertically above the base and resiliently supported. The seat support is supported on opposite sides by pairs of crossed pivotal arms and is also supported by a conical coil spring positioned between the pairs of pivotal arms. The seat supporting assembly also includes a ride height adjustment assembly and a vertical movement stop assembly functioning in combination as a means for limiting the vertical position of the seat support and the extent of resilient vertical movement of the seat support.

The ride height adjustment assembly is comprised of a plurality of pivotal linkages positioned between the upper end of the coil spring and the seat support and is functional to vary the vertical distance between the coil spring and the seat support thereby varying the vertical height of the seat support. The pivotal linkages are connected by a threaded shaft which can be rotated to cause relative vertical expansion or contraction of the linkages and consequent relative movement between the coil spring and the seat support. The shaft extends forwardly from under the seat and includes a handle at its end which is readily accessible to the vehicle operator. In operation, the vehicle operator will sit on the seat and will compress the coil spring. The amount of compression of the spring will depend upon the weight of the operator. In order to adjust the height of the seat, the operator can then turn the shaft handle until the seat is positioned such that he can conveniently reach the vehicle controls.

The vertical movement stop assembly provides an adjustable means for limiting the extent of vertical movement of the seat support and permits the vehicle operator to adjust the range of vertical movement of the seat support such that the seat is permitted limited resilient movement within a desired range of operation. The vertical movement stop assembly comprises a pair of links disposed on opposite sides of the spring and each slideably secured at their lower ends to an upper portion of one of the pivotal arms. The lower ends of the links each include axially extending slots which receive projections attached to one of the pivotally connected arms at a point generally intermediate its upper end, and the links are thus slideable relative to that arm by an amount determined by the length of the slot. The links extend forwardly and upwardly at an incline and are releaseably restrained at their upper ends by brackets secured to the seat support. The brackets supporting the upper ends of the links, each include a plurality of longitudinally spaced notches for receiving upper ends of the links and for releaseably securing the links in place in such a manner that the links can be adjustably positioned in various notches. The portions of the seat support and the pivotal arms to which the links are connected, move away from each other when the seat support moves upwardly and move toward each other when the seat support moves downwardly. By positioning the upper end of the link in a more forward notch in the bracket, the height of the upper limit of vertical movement of the seat support can be reduced. The upper ends of the links are connected to a forwardly extending handle which permits the operator to adjust their relative position in the various notches.

The seat supporting assembly also includes indicators for permitting the operator to visually check the position of the ride height adjustment assembly and the vertical movement stop assembly. By adjusting the position of the links of the vertical movement stop assembly and aligning the vertical movement stop assembly indicator with the ride height adjustment indicator, the operator can position the links to be permitted resilient vertical movement of the seat support at any desired height setting determined by the ride height adjustment means, and also provide means to limit the upward movement of the seat when the operator leaves the seat.

A particular advantage of the present seat supporting assembly of the present invention is that its structure, though providing resilient support for a seat, is also sufficiently rigid to permit a seat belt to be secured to the supporting assembly without the necessity of other supporting or restraining means connecting the seat belt to the vehicle. Generally, a seat belt supporting structure is required to withstand a 5,000 pound pull on the seat belt at angles varying from 45° to 75° from the horizontal. None of the prior art seat supporting assemblies are capable of meeting such requirements. Consequently, those seat supporting assemblies require the use of auxiliary supporting means for the seat belts such as secondary belts secured between the vehicle and the seat support. Such auxiliary supporting means are universally awkward and limit the effectiveness of the resilient seat support.

BRIEF DESCRIPTION OF THE DRAWINGS

FIG. 6 is a cross-sectional view taken along the line 6—6 in FIG. 1.

FIG. 7 is a cross-sectional view taken along the line 7—7 in FIG. 1 and showing the side suspension assembly in a depressed position.

DESCRIPTION OF THE PREFERRED EMBODIMENT

Figure 4:
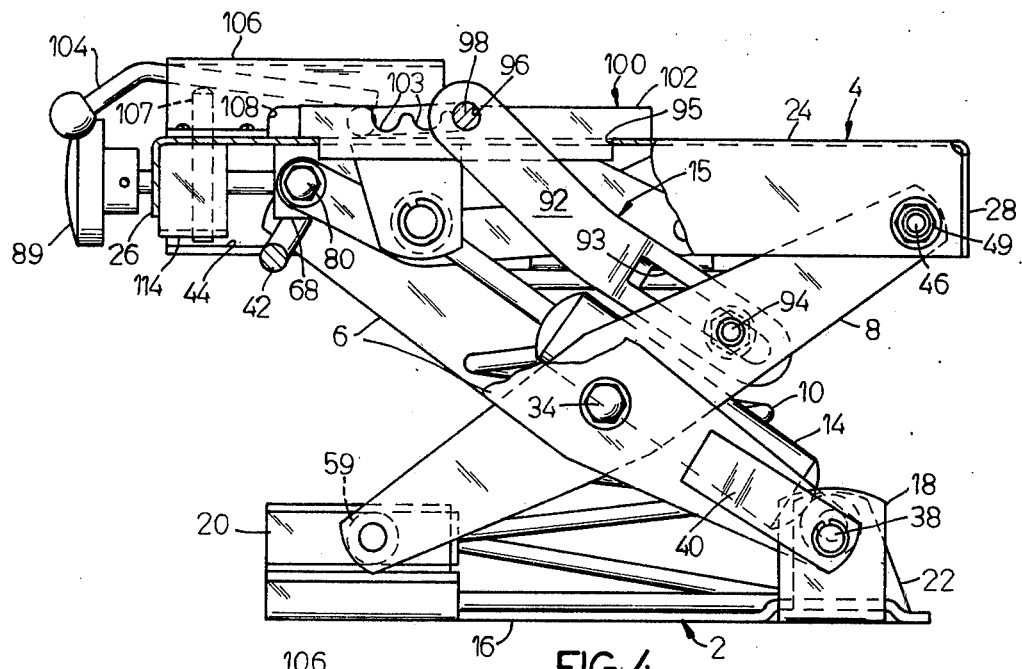
FIG. 4 is a view similar to FIG. 3 but with portions cut-away.

The seat supporting assembly of the present invention is generally comprised of a base member 2 which can be secured to a vehicle and a seat support 4 used to support a conventional vehicle seat or the like. The seat support 4 is supported above the base frame by two pairs of crossed pivotal arms 6 and 8, respectively. A resilient conical coil spring 10 is disposed between the two pairs of pivotal arms 6 and 8 and between the base 2 and in the seat support 4. A ride height adjustment assembly 12 is included between the upper end of the spring 10 and the bottom of the seat support 4 to permit variation of the position of the seat support 4 in a manner which will be described hereafter. The seat supporting assembly also includes a vertical movement stop assembly 15, best shown in FIG. 4, which functions in combination with the ride height adjustment assembly 12 to regulate the vertical position of the seat support 4. A shock absorber 14 (FIG. 4) is also provided and positioned in forwardly extending inclined relationship between the base member 2 and the seat support 4.

The base frame 2 is comprised of a plate 16 which can be secured to a vehicle, a pair of arm mounting brackets 18 extending upwardly from a rearward portion of the base plate 16, and a pair of spaced tracks 20 generally mounted at the forward end of the plate 16 and in laterally spaced relationship. The base plate 16 also supports a U-shaped mounting bracket 22 (FIG. 9) for supporting the lower end of the shock absorber 14.

The seat support 4 is comprised of a horizontally extending flat plate 24 having downwardly extending flanges 26 and 28 at its forward and rearward extremities as well as side walls 30 and 32.

Figure 1:
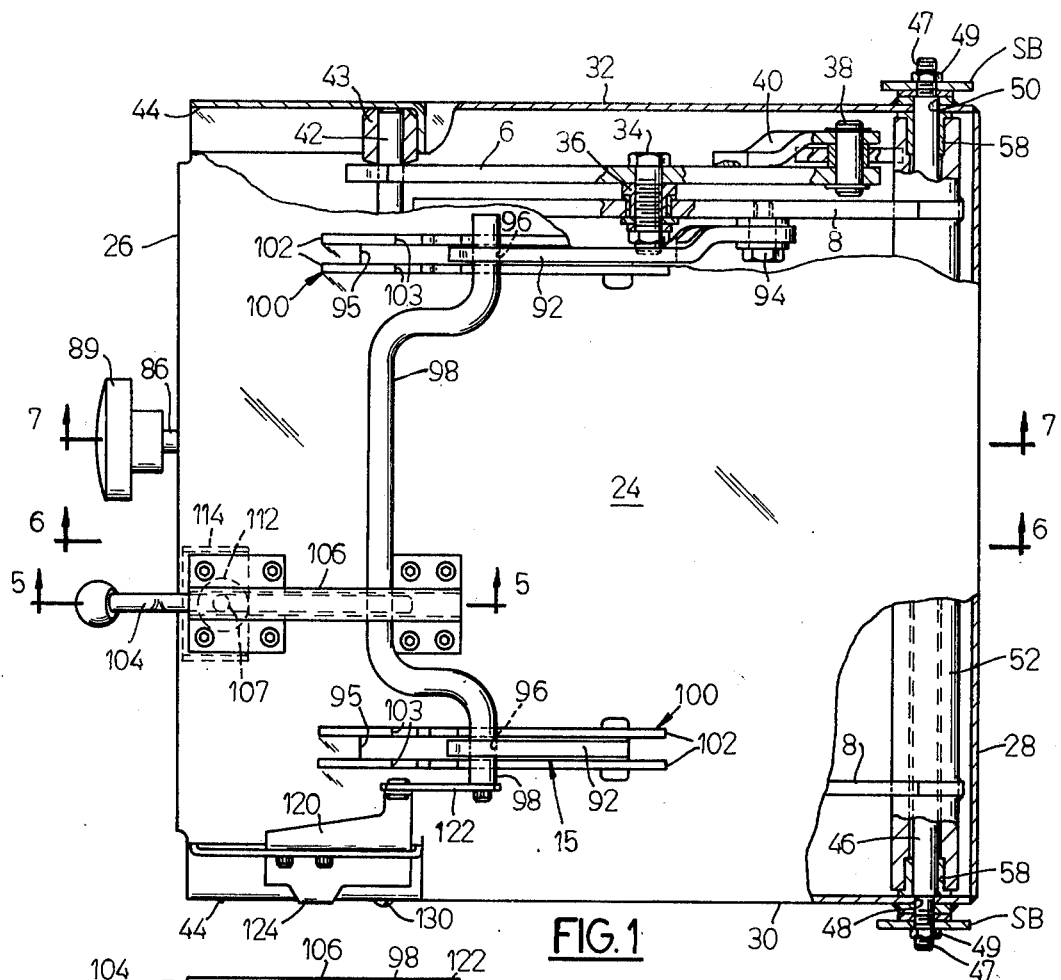
FIG. 1 is a plan view of the seat supporting assembly of the present invention with portions cut-away in the interest of clarity.
Figure 2:
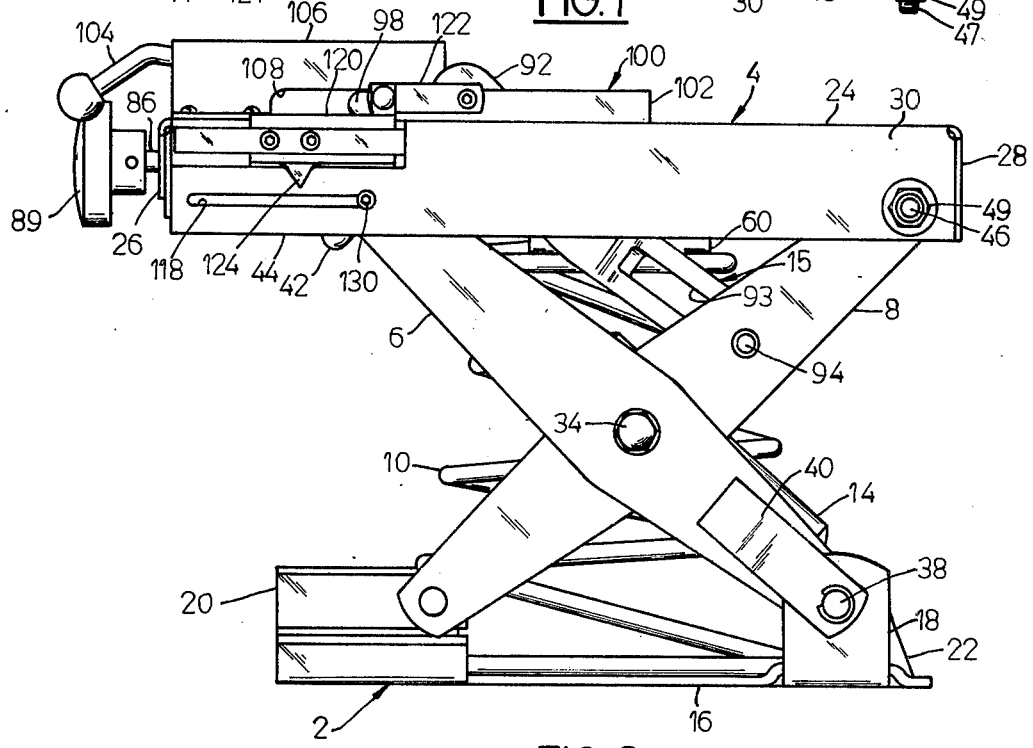
FIG. 2 is a side elevation view of the seat supporting assembly shown in FIG. 1 and showing the seat support in a fully elevated position.
Figure 3:
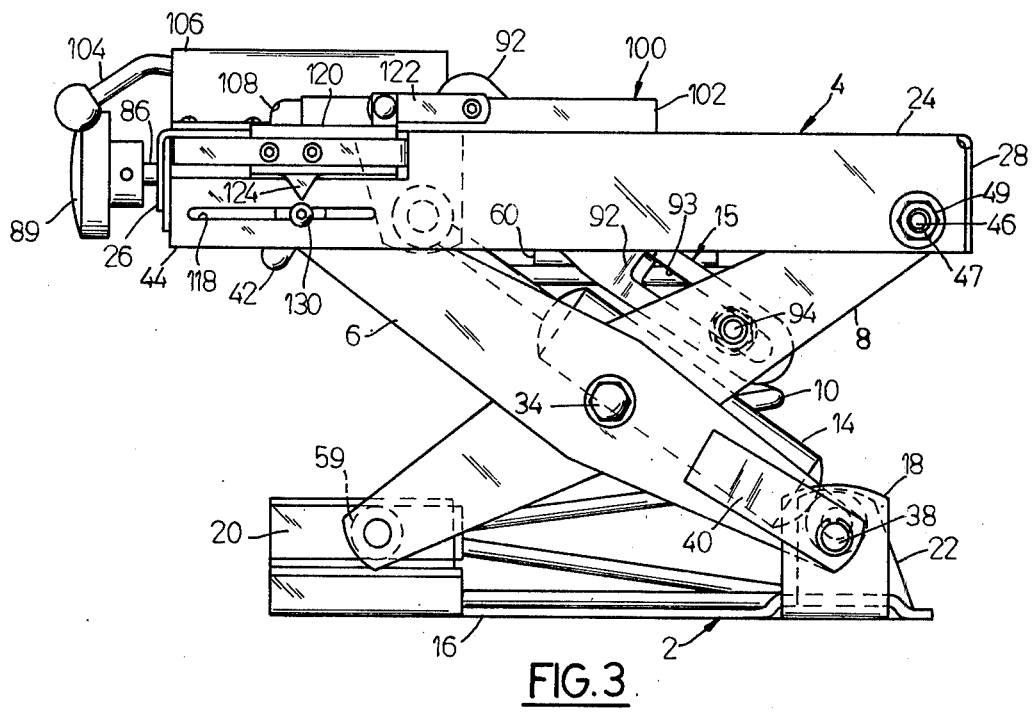
FIG. 3 is a side elevation view of the seat supporting assembly shown in FIG. 1 and shown in a partially compressed position.
Figure 8:
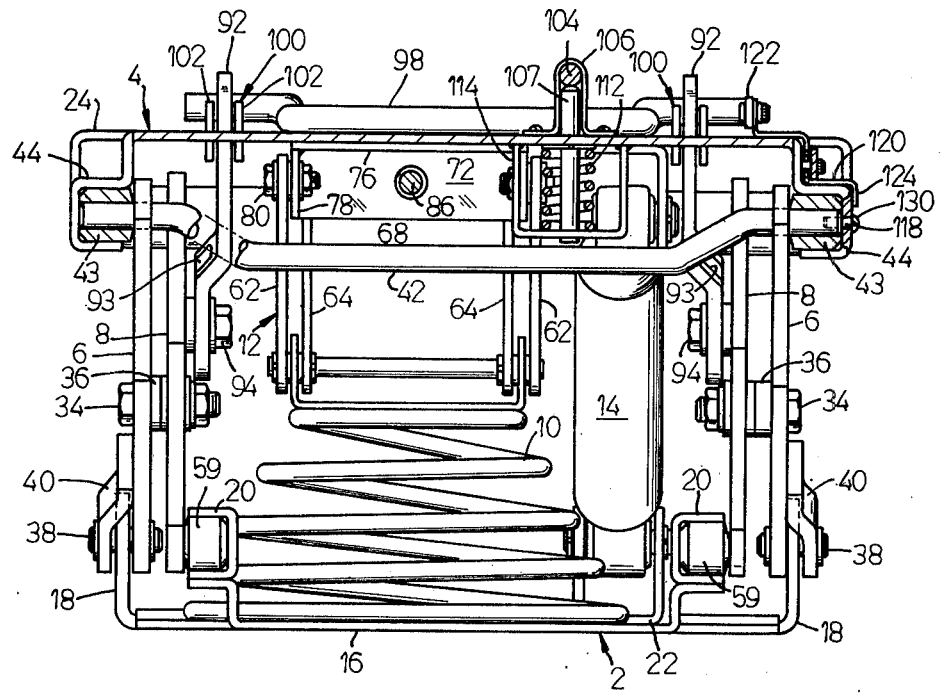
FIG. 8 is a cross-sectional view taken along the line 8—8 in FIG. 7.
Figure 9:
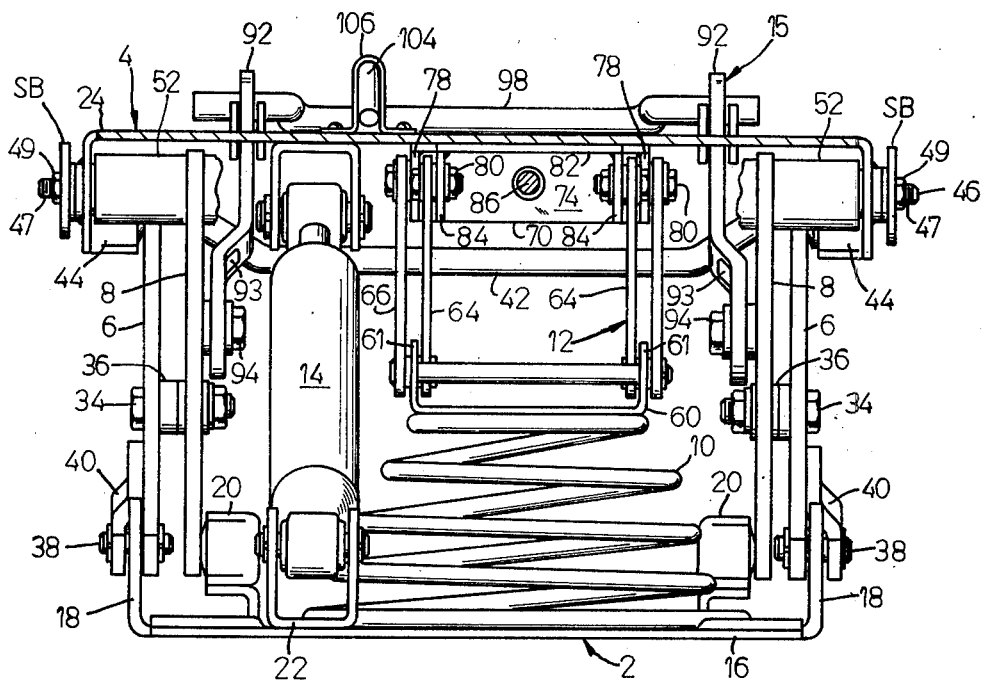
FIG. 9 is a cross-sectional view taken along the line 9—9 in FIG. 7.

The two pairs of pivotal arms 6 and 8 are disposed on opposite lateral sides of the seat supporting assembly, as shown in FIGS. 8 and 9, and function to restrict movement of the seat support 4 to only vertical movement and also to limit the extent of its vertical movement. Additional means for limiting the extent of vertical movement of the seat support 4 are also provided by the vertical movement stop assembly 15 to be described more fully below. As particularly shown in FIGS. 1 and 2, the pivotal arms 6 and 8 are pivotably connected at a point generally intermediate their lengths by a bolt 34 received through bores in each of the arms. A spacer 36 is also disposed between the arms 6 and 8 and surrounding the bolt 34 to facilitate spaced alignment of the arms and relative pivotal movement. The lower end of each of the pivotal arms 6 is pivotably supported by the upwardly extending bracket 18 of the base frame and by a pivot pin 38 extending through a bore in the bracket 18 and the arm 6. As shown in FIGS. 1, 8 and 9, a support link 40 is welded to the outside surface of each of the pivotal arms 6 and includes a bore for receiving the pivot pin 38. The brackets 18 are thus received between the support links 40 and the lower ends of the pivotal arms 6. The upper ends of each of the pivotal arms 6 include bores therein which receive opposite ends of an arm support shaft 42. The ends of the shaft 42 support rollers 43 thereon which are received within tracks 44 depending downwardly from the seat support 4 and comprising an integral portion of the side walls 30 and 32, respectively. The upper ends of the pivotal arms 8 include bores therethrough and are supported by a pivot shaft 46 which is in turn supported at its opposite ends within bores 48 and 50 in the rearward portions of the side walls 30 and 32, respectively. The shaft 46 is surrounded by a concentric spacer tube 52, which is rotatable around the shaft 46. The ends of the pivotal arms 8 receive the tube 52 therethrough and are rigidly secured to the tube by welding. Bushings 58 are disposed between the ends of the tube 52 and the ends of the shaft 46 to facilitate rotation of the tube 52 and also include flanges received between the side walls 30 and 32 and the tube 52. The lower ends of the pivotal arms 8 are each supported for reciprocating forward and rearward movement in the tracks 20 secured to the base 2. The lower ends of each of the arms 8 include a bore receiving a shaft therein. The shaft in turn supports a roller 59 (FIG. 8) received within the tracks 20 to permit forward and rearward movement of the lower end of the arms. It can thus be seen that the pivotal arms 6 and 8 support the seat support for vertical movement in that the rearward ends of the arms 6 and 8 are pivotably supported and the forward ends are each slideably supported within tracks 44 and 20, respectively.

As best shown in FIG. 1, the ends of the pivot shaft 46 extend outwardly beyond the side walls 30 and 32, and include threaded ends 47. The threaded ends 47 are designed to receive the ends of a seat belt SB which can be secured thereon by nuts 49.

RIDE HEIGHT ADJUSTMENT ASSEMBLY

As previously stated, the ride height adjustment assembly 12 is positioned between the top of the spring 10 and the seat support 4 and is designed to provide means to compensate for the various weights of different operators. Since operators of different weight will compress the spring 10 by varying amounts depending upon their weight, it is advantageous to have means to adjust the height of the seat to permit the operator to alter the position of the seat such that the controls of the vehicle will be readily accessible to him. The structure of the ride height adjustment assembly 12 is best shown in FIGS. 6–9. A bracket 60, including two upwardly extending lateral sides 61, is secured to the upper portion of the coil spring 10. Three angular rigid linkages 62, 64 and 66 are each pivotably secured at one of their ends to the bracket 60, linkages 62 and 64 being secured to a forward portion of the side 61 and linkage 66 being pivotably secured to a rearward portion of the side 61. The upper ends of the linkages 62 and 66 are in turn pivotably connected to forward and rearward portions of a slideable bracket 68 which is slideably received against the lower surface of the top plate 24 of the seat support 4. Similarly, the upper end of the linkage 64 is pivotably connected to a slideable bracket 70 also slideably received against the lower surface of the plate 24. Each of the brackets 68 and 70 include laterally extending bars 72 and 74, respectively, which are welded to the brackets and which include oppositely threaded bores therethrough. The bracket 68 includes an upper plate 76 slideably received against the lower surface of the top plate 24 and two downwardly extending laterally spaced side walls 78. The bracket 70 similarly includes an upper wall 82 and side walls 84 supporting the bar 74 therebetween. The upper ends of linkages 62 and 66 are secured to the side walls 78 by means of bolts 80. The threaded bores of the bars 72 and 74 each receive threaded portions 85 and 87, respectively, of a threaded shaft 86. The shaft 86 is centrally disposed and extends forwardly through a bore in the front wall 26 of the seat support 4 and is supported at its rearward end by a downwardly extending bracket 88 secured to the lower surface of the top plate 24. The forward end of the shaft 86 includes a knob 89 to permit the operator to rotate the shaft. The threaded sections 85 and 87 of the shaft 86 are oppositely threaded with respect to each other such that rotation of the shaft will cause movement of the brackets 68 and 70 either toward or away from each other.

In operation, when the vehicle operator sits upon a seat supported by the seat support 4, he will compress the coil spring 10 as shown in FIG. 7. The operator may then control his relative vertical position by rotating the knob 89 and the shaft 86 thereby causing relative movement of the brackets 68 and 70. If the shaft is rotated such that the brackets 68 and 70 move closer together, as shown by comparison of FIGS. 6 and 7, the linkages 62, 64 and 66 will cause a change in the relative position of the seat support 4 with respect to the upper portion of the spring 10 and cause the seat support 4 to be raised.

VERTICAL MOVEMENT STOP ASSEMBLY

The seat supporting assembly also includes a vertical movement stop assembly 15 which functions to limit the extent of vertical movement of the seat support 4 and is adjustable to permit variation in the range of vertical movement of the seat support to accommodate adjustment of the desired vertical position of the seat support by the ride height adjustment assembly 12.

The vertical movement stop assembly 15 is best shown in FIGS. 1, 4, 8 and 9 and is comprised of a pair of links 92 which are disposed in laterally spaced relationship on opposite sides of the coil spring 10 but inside and parallel to the two pairs of pivotal arms 6 and 8. The links 92 each include a generally axially extending slot 93 in their lower end which slideably receives a bolt 94 extending through the pivotal arm 8. The bolt 94 is positioned through an upper end of the arm 8 and generally intermediate the bolt 34 pivotably joining the arms 6 and 8 and the upper end of the arm 8 supported by the pivotal shaft 46. It should be noted that the links 92 and the arm 8 are relatively movable an amount defined by the length of the slot 93.

The links 92 extend forwardly and upwardly in an inclined relationship and the upper ends of the links are received through parallel longitudinally extending slots 95 located in the plate 24 of the seat support 4. The upper ends of the links 92 extending upwardly through the slots 95 each include bores 96 therein which receive opposite ends of a shaft 98. A pair of brackets 100 are secured to the upper surface of the plate 24 and each include a pair of vertically disposed longitudinally extending side walls 102 positioned on opposite sides of the slots 95. Each of the side walls 102 include a plurality of longitudinally spaced grooves or notches 103 therein designed to receive the ends of the shaft 98 in such a manner that the shaft can be releaseably secured therein.

The links 92 function to limit the vertical movement of the seat support 4 in the following manner. During upward movement of the seat support 4, relative to the base 2, the distance between the ends of the shaft 98 received in the brackets 102 and the bolts 94 increases and the extent of vertical movement of the seat support 4 is thus limited by the bolt 94 received against the lower end of the slot 93. By moving the upper end of the links 92 forwardly such that they are received in one of the forward notches or grooves, the relative space between the bolt 94 and the lower end of the slot 93 is decreased and the upper limit of vertical movement of the seat support 4 is likewise limited.

Figure 5:
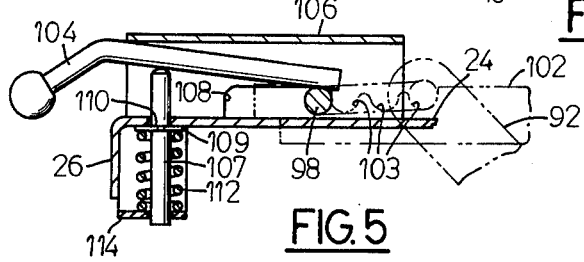
FIG. 5 is a cross-sectional view taken along the line 5—5 in FIG. 1.

The relative positioning of the upper end of the links 92 is facilitated by means of a forwardly extending handle 104 which has one end projecting forwardly so as to be accessible to the vehicle operator and another end connected to the shaft 98. By pulling downwardly and then forwardly on the handle 104, it is possible to slide the ends of the shaft 98 to forwardly positioned notches or grooves 103. The handle 104 is restrained by a bracket 106 which is secured to the plate 24 and which includes a lower slot 108 therein for receiving the center section of the shaft 98 and for permitting longitudinal or forward and rearward movement of the shaft 98. As best shown in FIG. 5, the forwardly projecting end of the handle 104 is biased in an upward position by means of a spring biased plunger 107. The plunger 107 includes a washer 109 received in a groove 110 therein and functioning as a collar. A spring 112 is compressed between the washer 109 and a rigid bracket 114 supporting the plunger and biases the plunger 107 upwardly against the handle 104. The opposite end of the handle 104 is rigidly secured, for example, by welding to the intermediate section of the shaft 98 such that downward movement of the foward projecting portion of the handle 104 causes torque on the shaft 98 and consequent upward movement of the ends of the shaft received through the links 92. The ends of the shaft 98 are thus moved upwardly out of the grooves or notches 103 and the handle 104 can be moved either forwardly or backwardly to reposition the ends of the shaft in other notches or grooves thus repositioning the upper end of the links 92.

In order to indicate the relative position of the upward ends of the links 92, a slideably movable indicator 120 is attached to one of the shaft 98, by means of a linkage 122. The indicator 120 includes a pointer 124 integrally attached thereto and slideable in a longitudinal direction parallel to the track 44. The track 44 also includes a generally horizontally extending slot 118 for slideably receiving a screw 130 which is secured to the end of shaft 42. The screw 130 is functional to indicate the relative vertical height of the seat support 4 in that it indicates the relative position of the slideable upper end of the pivotal arm 6 with respect to the side wall 30.

In operation, it is desirable that the vertical movement stop assembly be positioned in accordance with the operator's weight and the desired position of the seat support 4. In order to properly position the vertical movement stop assembly, after the operator has adjusted the ride height adjustment to position the seat at its desired height, the operator should then operate the handle 104 to move the upper ends of the links 92 either forwardly or backwardly to a position where the pointer 124 is substantially aligned with the screw 130. This will align the links 92 in such a manner that the seat support is permitted resilient vertical movement in a range approximating the desired seat position.

We claim:
1. A seat supporting assembly comprising:
   a base member;

a seat support positioned above said base member and supported for vertical movement;

at least one pair of arms disposed between said base member and said seat support and movable to permit vertical movement of said seat support;

resilient supporting means and height adjustment means disposed in vertically stacked adjacent relationship and between said base member and said seat support, said height adjustment means including a plurality of pivotal linkages, each of said pivotal linkages opposite ends, one of said ends being pivotably connected to said resilient supporting means, and including means for causing relative movement of at least two of the other of said ends toward each other whereby said height adjustment means expands vertically moving said seat support upwardly; and means for limiting the vertical movement of said seat support, said means for limiting the vertical movement of said seat support being adjustable for selectively adjusting the extent of vertical movement of said seat support and including connecting means for operably connecting said seat support and at least one of said pair of arms and for limiting movement of said one of said pair of arms with respect to said seat support, said connecting means being shiftably connected to said seat support for movement with respect to said seat support and said one of said pair of arms slideably engagable with said connecting means.

2. A seat supporting assembly comprising:

a base member;

a seat support positioned above said base member and supported for vertical movement;

resilient supporting means and height adjustment means disposed in adjacent relationship and between said base member and said seat support, said height adjustment means including a plurality of pivotal linkages, each of said pivotal linkages having opposite ends, one of said ends being pivotably connected to said resilient supporting means, and including means for causing relative movement of at least two of the other of said ends toward each other whereby said height adjustment means expands vertically moving said seat support upwardly;

means for limiting the vertical movement of said seat support, said means being adjustable for selectively adjusting the extent of vertical movement of said seat support; and support, said arms each having opposite ends and said arms being pivotably joined intermediate said ends, said arms each being connected at one end to said base and connected at their other end to said seat support.

3. A seat supporting assembly comprising:

a base member;

a seat support positioned above said base member and supported for vertical movement;

resilient supporting means and height adjustment means disposed in adjacent relationship and between said base member and said seat support, said height adjustment means including a plurality of pivotal linkages, each of said pivotal linkages having opposite ends, one of said ends being pivotably connected to said resilient support means, and including means for causing relative movement of at least two of the other of said ends toward each other whereby said height adjustment means expands vertically moving said seat support upwardly;

means for limiting the vertical movement of said seat support, said means being adjustable for selectively adjusting the extent of vertical movement of said seat support; and pivotal arms extending between said base member and said seat support for supporting said seat support and wherein said means for limiting includes at least one link extending between one of said pivotal arms and said seat support, said link including a slot in one end, said one end slideably supported for limited movement and said link restricting the extent of relative vertical movement of said seat support.

4. The seat supporting assembly set forth in claim 3 wherein said one end of said link is supported at said one end by said one of said pivotal arms and supported at its other end by said seat support, and wherein said link restricts relative movement between said seat support and that position of the arm to which said link is connected.

5. The seat supporting assembly set forth in claim 2 wherein said limiting means includes at least one link, said link having opposite ends and having an axially extending slot in one of said ends and wherein one of said pair of arms includes a projection extending therefrom received in said slot whereby said link is supported by said one of said arms for limited slideable movement, and wherein said seat support includes a link supporting bracket, said bracket including a plurality of notches, another of said ends of said link being adjustably receiving in one of said notches.

6. The seat supporting assembly set forth in claim 1 wherein said means for causing relative movement includes a pair of spaced slideable brackets movable toward and away from each other and a threaded shaft connecting said brackets and rotatable to move said brackets toward and away from each other, one of said linkages being pivotably connected at its other of said ends to one of said slideable brackets and another of said pivotable linkages being connected at its other of said ends to the other of said slideable brackets whereby rotation of said shaft causes relative movement of said slideable brackets and relative movement of said ends.

7. A seat supporting assembly comprising: a base member; a seat support positioned above said base member and supported for vertical movement; at least one pair of arms disposed between said base member and said seat support said arms each having opposite ends and said arms being pivotably joined at a point intermediate said ends, said arms each having an end connected to said base and an other end connected to said seat support; resilient supporting means disposed between said base member and said seat support for resiliently supporting said seat support; and means for limiting vertical movement of said seat support, said limiting means including at least one link having one end slideably connected to at least one of said pair of arms for limited slideable movement with respect to said one of said pair of arms and the other end supported by said seat support, said link including a slot in one end and wherein at least one of said pair of arms includes a projection between said point intermediate said ends and said other end connected to said seat support, said projection being slideably receivable in said slot for limited slideable movement and wherein said link restricts the relative vertical movement between said seat support and said projection.

8. A seat supporting assembly comprising: a base member; a seat support positioned above said base member and supported for vertical movement; at least one pair of arms disposed between said base member and said seat support; resilient supporting means disposed between said base member and said seat support for resiliently supporting said seat support; and means for limiting vertical movement of said seat support, said limiting means including at least one link having one end slideably connected to at least one of said pair of arms for limited slideable movement with respect to said one of said pair of arms and the other end supported by said seat support, and wherein said seat support includes a link supporting means having a plurality of spaced notches therein, said link being adjustably positionable in one of said notches whereby said link is releasably restrained.

9. A seat supporting assembly comprising:
a base member;
a seat support positioned above said base member and support for movement with respect to said base member; a resilient supporting mean disposed between said base member and said seat support; at least a pair of arm disposed between said base member and said seat support for supporting said seat support, said arms having opposite ends and being pivotably joined intermediate said ends, said arms each being connected at one end to said base and connected at their other end to said seat support; height adjustment means disposed between said resilient supporting means and said seat support, said height adjustment means including a plurality of pivotal linkages, each of said linkages having opposite ends and each of said linkages being pivotably supported at one of said ends by said resilient supporting means, and connecting means causing relative movement of at least two of the other ends of said linkages interconnecting the said other ends; and means for limiting the vertical movement of said seat support, said limiting means including at least one link having one end slideably connecting to at least one of said arms and the other end releasably supported by said seat support, said other end selectively adjustable to vary the position of said link.

* * * * *